United States Patent
Laflamme et al.

(10) Patent No.: US 8,915,025 B2
(45) Date of Patent: Dec. 23, 2014

(54) CUT AND RIGIDIFIED CONSTRUCTION COMPONENT AND METHOD OF MANUFACTURING THE SAME

(75) Inventors: Martin Laflamme, St-Romuald (CA); Nicolas Bernier, St-Cyrille (CA); Mario L'Allier, Notre-Dame-du-Portage (CA); Alain Robichaud, Ste-Louise (CA); Gabriel Côté, La Pocatière (CA)

(73) Assignee: Bombardier Transportation GmbH, Berlin (DE)

( * ) Notice: Subject to any disclaimer, the term of this patent is extended or adjusted under 35 U.S.C. 154(b) by 850 days.

(21) Appl. No.: 12/679,082

(22) PCT Filed: Sep. 21, 2007

(86) PCT No.: PCT/CA2007/001708
§ 371 (c)(1), (2), (4) Date: Oct. 28, 2010

(87) PCT Pub. No.: WO2009/036548
PCT Pub. Date: Mar. 26, 2009

(65) Prior Publication Data
US 2011/0043002 A1 Feb. 24, 2011

(51) Int. Cl.
*B61D 17/12* (2006.01)
*E04G 15/02* (2006.01)
(Continued)

(52) U.S. Cl.
CPC ............ *B62D 33/04* (2013.01); *Y02T 30/34* (2013.01); *B21D 11/02* (2013.01); *B61D 17/04* (2013.01)
USPC .......... 52/85; 52/45; 52/108; 52/639; 52/644; 296/187.03; 296/187.09; 296/203.01; 296/30; 293/133; 293/102

(58) Field of Classification Search
USPC .......... 52/639, 640, 644, 673, 684, 850, 851, 52/856, 857, 45–56, 108, 85, 245, 247; 296/187.03, 187.09, 203.01, 30; 293/133, 102; 29/557; 72/324; 219/121.72
See application file for complete search history.

(56) References Cited

U.S. PATENT DOCUMENTS 1,708,753 A * 4/1929 Dalton .......................... 280/781
1,918,346 A * 7/1933 McHose ....................... 403/267
(Continued)

FOREIGN PATENT DOCUMENTS

GB 945649 A 1/1964
WO 98/18580 A1 5/1998

OTHER PUBLICATIONS

European Search Report: dated Apr. 15, 2011; Appln. EP 07 81 5897.
(Continued)

*Primary Examiner* — Phi A
*Assistant Examiner* — Omar Hijaz
(74) *Attorney, Agent, or Firm* — Ladas & Parry LLP

(57) ABSTRACT

A method of creating a bend in a construction component for use in a transportation vehicle. The method comprises providing a plurality of cuts in the construction component so as to create a region of increased flexibility in the construction component. The method further comprises bending the construction component in the region of increased flexibility so as to cause the construction component to acquire a bent shape, and then rigidifying the construction component in the region of increased flexibility so as to cause said construction component to maintain the acquired bent shape.

28 Claims, 11 Drawing Sheets

(51) Int. Cl.
*E04H 12/18* (2006.01)
*E04B 1/32* (2006.01)
*B62D 29/00* (2006.01)
*B60J 7/00* (2006.01)
*B60N 3/00* (2006.01)
*B60R 19/02* (2006.01)
*B60R 19/34* (2006.01)
*B21D 11/02* (2006.01)
*B62D 33/04* (2006.01)
*B61D 17/04* (2006.01)

(56) References Cited

U.S. PATENT DOCUMENTS

| | | | | |
|---|---|---|---|---|
| 1,963,060 | A * | 6/1934 | Abt | 52/90.1 |
| 2,181,164 | A * | 11/1939 | Alexander | 52/631 |
| 2,197,318 | A * | 4/1940 | Rumble | 52/291 |
| 2,277,615 | A * | 3/1942 | Townsend | 29/897.35 |
| 2,277,616 | A | 3/1942 | Townsend | |
| 2,745,277 | A * | 5/1956 | Nelsson | 52/241 |
| 3,066,394 | A * | 12/1962 | Litzka | 29/564.2 |
| 3,078,971 | A * | 2/1963 | Wallerstein, Jr. | 52/403.1 |
| 3,260,022 | A * | 7/1966 | Guyer et al. | 52/86 |
| 3,413,774 | A * | 12/1968 | Oberreich | 52/831 |
| 3,706,173 | A * | 12/1972 | Taylor | 52/717.03 |
| 3,904,380 | A * | 9/1975 | Smith | 428/582 |
| 3,971,176 | A * | 7/1976 | Rannels | 52/86 |
| 4,206,536 | A * | 6/1980 | Hammond et al. | 29/402.11 |
| 4,269,255 | A * | 5/1981 | Nailor et al. | 160/381 |
| 4,337,708 | A | 7/1982 | Peterson | |
| 4,557,090 | A | 12/1985 | Keller, Sr. | |
| 4,679,763 | A * | 7/1987 | Brotherton | 29/446 |
| 4,704,838 | A | 11/1987 | Wendt | |
| 4,749,203 | A * | 6/1988 | Bright | 277/642 |
| 4,783,946 | A * | 11/1988 | Boegle | 52/506.1 |
| 4,824,068 | A * | 4/1989 | Ferland | 249/2 |
| 4,874,150 | A * | 10/1989 | Heinzle | 249/18 |
| 5,010,709 | A | 4/1991 | Paz | |
| 5,137,251 | A * | 8/1992 | Jennings | 249/189 |
| 5,338,091 | A * | 8/1994 | Miller | 297/218.4 |
| 5,603,541 | A | 2/1997 | Wada et al. | |
| 5,671,583 | A * | 9/1997 | Turner | 52/745.16 |
| 5,725,247 | A * | 3/1998 | Nilsson et al. | 280/781 |
| 5,806,266 | A * | 9/1998 | Jennings et al. | 52/644 |
| 5,890,339 | A * | 4/1999 | Willis | 52/640 |
| 6,070,374 | A * | 6/2000 | Bifano et al. | 52/86 |
| 6,094,877 | A * | 8/2000 | White | 52/247 |
| 6,119,420 | A * | 9/2000 | Koenig et al. | 52/255 |
| 6,125,765 | A * | 10/2000 | Loomer | 104/89 |
| 6,434,908 | B1 * | 8/2002 | Ferrante | 52/481.2 |
| 6,481,259 | B1 * | 11/2002 | Durney | 72/324 |
| 6,758,025 | B2 * | 7/2004 | Haberler | 52/741.11 |
| 6,957,517 | B2 * | 10/2005 | Auriemma | 52/506.07 |
| 7,401,440 | B2 * | 7/2008 | Hauck | 52/80.1 |
| 7,648,035 | B2 * | 1/2010 | Edwards et al. | 211/41.14 |
| 8,141,316 | B2 * | 3/2012 | Remin | 52/631 |
| 2004/0031210 | A1 * | 2/2004 | Kjorsvik | 52/58 |
| 2005/0115192 | A1 * | 6/2005 | Stone et al. | 52/720.1 |

OTHER PUBLICATIONS

International Search Report: PCT/CA2007/001708.
Written Opinion of the International Searching Authority mailed on Jun. 23, 2008 in connection with International Patent Application PCT/CA2007/001708, 6 pages.
Examiner's report issued Oct. 24, 2012 in connection with Canadian Patent Application 2,699,673, 3 pages.
Examiner's report issued Mar. 14, 2013 in connection with Canadian Patent Application 2,699,673, 2 pages.
European Search Report issued on Dec. 14, 2012 in connection with European Patent Application 07815897.9, 8 pages.
European Search Report issued on Jul. 2, 2014 in connection with European Patent Application 07815897.9, 5 pages.
Office Action issued on Aug. 9, 2013 in connection with Mexican Patent Application MX/a/2010/003122, 2 pages.
Office Action issued on Mar. 4, 2014 in connection with Mexican Patent Application MX/a/2010/003122, 2 pages.

* cited by examiner

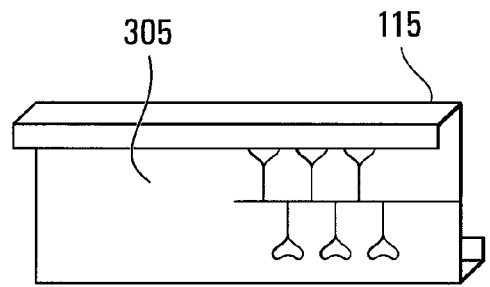 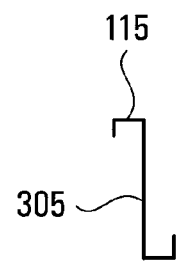
FIG. 3  FIG. 4
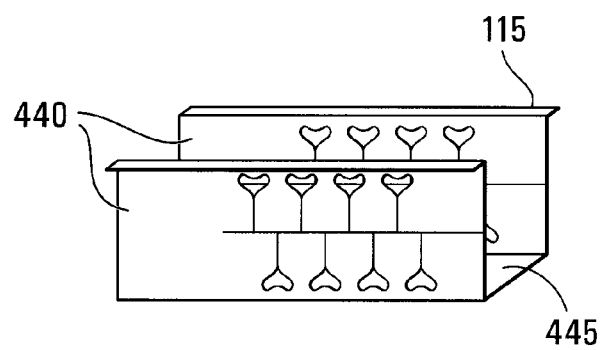 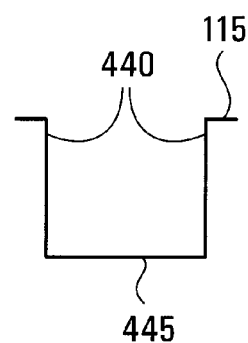
FIG. 5  FIG. 6
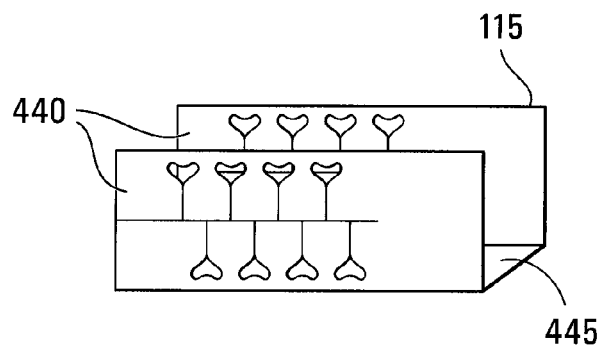 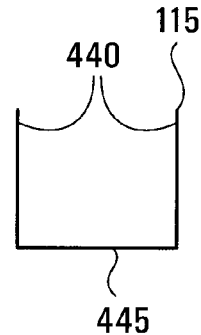
FIG. 7  FIG. 8

CUT AND RIGIDIFIED CONSTRUCTION COMPONENT AND METHOD OF MANUFACTURING THE SAME

FIELD OF THE INVENTION

The present invention relates to the field of structural components suitable for use in construction, and more particularly, to a method of providing cuts and rigidifying a construction component, such as a beam, such that it is suitable for use in the frame of a transport vehicle.

BACKGROUND OF THE INVENTION

Structural steel and aluminum beams are well known in the field of construction. They are often used for creating structural support in many buildings and transportation vehicles, such as train cars and transport trucks.

In many cases, the construction components need to be bent or curved so as to fit their intended use. Creating bends and curves in construction components, such as structural support beams, is known in the art, and is often done using a process known as stretch forming. Stretch forming involves creating a bend or curve in the component by stretching and pulling it into the desired form. Unfortunately, while stretch forming can provide the desired shape in the component, there are numerous deficiencies associated with this process.

A first deficiency with the stretch forming process is that it results in a finished component that has an inconsistent thickness. As a result, the stretch formed component experiences inconsistent fatigue along its surface area, leading to sometimes unpredictable performance. Therefore, in order to ensure adequate thickness throughout, it is necessary to overestimate the thickness of the raw material used in the stretch forming process such that no area of the stretch formed part is too thin. This creates an unnecessary excess of material, resulting in a waste of material, added material costs and excessive weight, thus rendering the component heavier, and more expensive than might be possible.

A further deficiency with the stretch forming process is that it requires specific equipment and expertise to do. The expensive and complicated machinery required for this process is not generally available in average workshops, such that this process cannot be carried out conveniently at any machine shop. Instead, in most cases, the stretch forming procedure needs to be outsourced to a facility with the appropriate equipment, which often increases the costs associated with producing the final component.

Yet another deficiency with the stretch forming process is that stretch forming equipment must clamp on a portion of the raw material in order to stretch it. The area that has been clamped is deformed as a result of the stretch and must therefore be discarded. Stretch forming thus results in practice in a significant waste of raw materials.

Yet another deficiency with stretch forming process is that in order to meet the minimum thickness requirements of the finished product, the process requires the use of a heavier gauge raw material (larger thickness and weight) resulting in increased cost of the finished product as well as increased weight. In cases, such as in transportation vehicle manufacturing, such weight increases may result in a higher un-laden vehicle weight resulting in increased cost of vehicle certification. Worst case, such increased weight may render the vehicle unsuitable for use in certain projects.

In the context of the above, it can be appreciated that there is a need in the industry for an improved component and process of manufacturing the same, that alleviates, at least in part, the deficiencies associated with existing construction components and their manufacturing processes.

SUMMARY OF THE INVENTION

In accordance with a first broad aspect, the present invention provides a method of creating a bend in a construction component for use in a transportation vehicle. The method comprises providing a plurality of cuts in the construction component so as to create a region of increased flexibility in the construction component. The method further comprises bending the construction component in the region of increased flexibility so as to cause the construction component to acquire a bent shape, and then rigidifying the construction component in the region of increased flexibility so as to cause said construction component to maintain the acquired bent shape.

In accordance with a second broad aspect, the present invention provides a construction component for a transportation vehicle. The construction component is formed by providing a plurality of cuts in the construction component so as to create a region of increased flexibility in the construction component. The construction component is then bent in the region of increased flexibility so as to cause the construction component to acquire a bent shape, and is then rigidified in the region of increased flexibility so as to cause said construction component to maintain the acquired bent shape.

In accordance with a third broad aspect, the present invention provides a construction component for use in a transportation vehicle. The construction component comprises a bent region comprising plurality of cuts therein and a weld portion in communication with at least some of the plurality of cuts for rigidifying the construction component in the bent region.

In accordance with a fourth broad aspect, the present invention provides a construction component for use in a transportation vehicle. The construction component comprises a bent region comprising a plurality of cuts therein and a cover plate positioned over at least some of said plurality of cuts and affixed to said construction component in said bent region for rigidifying said construction component in said bent region.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which:

FIG. 3 shows a perspective view of a first non-limiting example of a construction component in accordance with the present invention, prior to the component being bent;

FIG. 4 shows a cross-sectional diagram of the construction component of FIG. 3;

FIG. 5 shows a perspective view of a second non-limiting example of a construction component in accordance with the present invention, prior to the component being bent;

FIG. 6 shows a cross-sectional diagram of the construction component of FIG. 5;

FIG. 7 shows a perspective view of a third non-limiting example of a construction component in accordance with the present invention, prior to the component being bent;

FIG. 8 shows a cross-sectional diagram of the construction component of FIG. 7;

Figure 1:
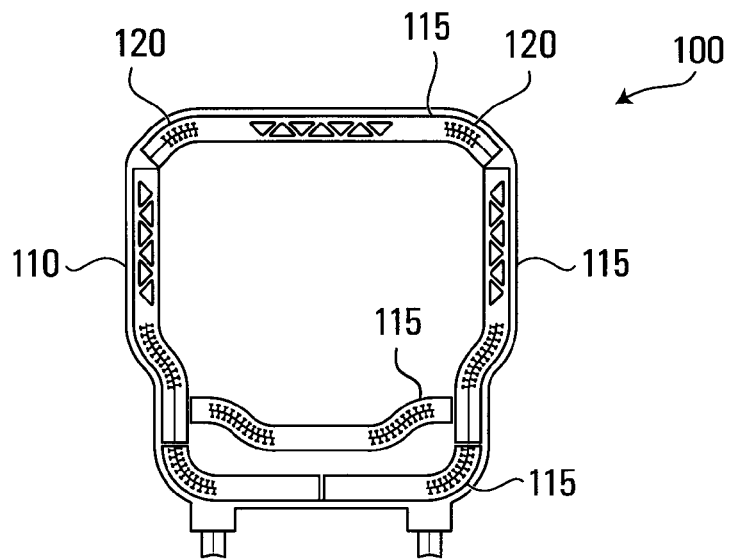
FIG. 1 shows a cross-sectional diagram of a railway car that includes a plurality of non-limiting examples of construction components manufactured in accordance with the present invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

The present invention relates to a process for manufacturing construction components that involves a cutting and rigidifying technique. The construction components described herein can be used in building construction and in the construction of transportation vehicles, without departing from the spirit of the present invention. The term transportation vehicle as used herein is meant to designate any vehicle capable of mobility, either by its own mechanism or by having mobility imparted to it by an external mechanism. Accordingly a transportation vehicle can include a train car (for carrying passengers or cargo), a locomotive, a bus, a subway car, an automobile, as well as any aerospace or water transportation vehicle. For the purposes of the description, the construction component will be described in the context of a railway vehicle, however, it should not be construed that the construction components are limited to use in only railway vehicles.

Shown in FIG. 1 is a cross-sectional view of a railway car 100 in which a plurality of construction components 115 in accordance with the present invention are incorporated. As shown, the plurality of construction components 115 form the structural frame of the railway car 100 for supporting the outer housing 110 of the railway car 100. As shown, each construction component 115 includes at least one bend therein. The structural frame shown in FIG. 1 includes roof carlines, wall-supporting posts, floor supports and lower frame supports, all of which can be formed from construction components 115 manufactured according to the present invention. It should be appreciated that the construction component can be a structural member used for structurally supporting a construction or can be any other part of the construction, such as part of the facade or outer frame.

A non-limiting example of a process for manufacturing the construction components 115 in accordance with the present invention will now be described in more detail with respect to the flow chart shown in FIG. 2. As shown, the process includes four general steps. Firstly, at step 205, the cross sectional shape of the construction component 115 is formed out of an appropriate substrate, such as a sheet of raw material. At step 210, cuts are provided in the construction component in order to impart flexibility to a particular region of the component 115. More specifically, the cuts create a region of increased flexibility in the component 115. Then, at step 215 the component 115 is bent in the region of increased flexibility, so as to cause the component 115 to acquire a bent shape. Finally at step 220, the construction component 115 is rigidifying in its region of increased flexibility such that it maintains the bent shape. Each of these steps will now be described in more detail below with reference to the remaining figures.

As mentioned above, at step 205, a metal substrate is formed into the desired shape of the construction component 115 (examples of such desired shapes are shown in FIGS. 3, 4, 5, 6, 7 and 8). The metal substrate, from which the component is formed, is generally provided as a sheet of material that can be of any suitable shape or size. For example, the substrate may be provided in rectangular sheets that are 4 ft×8 ft. in dimension. In addition, the substrate from which the cross sectional shape of the components 115 is formed can be of any suitable material, the selection of which may vary based on the intended application of component. For example, the substrate could be a sheet of steel, stainless steel, aluminum, titanium or composites among other possibilities. In addition, the substrate could be made of polymers or plastics. Depending on the material, different means for forming the substrate into the desired cross-sectional shape of the component may be appropriate, all of which are included within the intended scope of the present invention. In accordance with a non-limiting example, the substrate can be formed into the desired shape of the component via a break press that is used to bend a flat sheet of material into the desired cross-sectional shape of the component 115. In an alternate exemplary embodiment, the sheet of material may be made into the cross-sectional shape of the component 115 using roll forming techniques.

As shown in FIGS. 3, 5 and 7, the component 115 is generally formed into a long beam-like member having a cross-sectional shape and configuration that provides a desired rigidity and strength to the component 115. The cross-sectional shape of the component 115 can take on a variety of different forms. Shown in FIGS. 3, 4, 5, 6, 7 and 8 are some non-limiting examples of different cross-sectional shapes for components 115 that are suitable for use in a railcar. In the embodiment shown in FIGS. 3 and 4, the component 115 has a generally Z-shaped cross section. FIGS. 5 and 6 illustrate a component 115 that has an omega-shaped cross section, and FIGS. 7 and 8 show a component 115 that has a U-shaped cross-section. It should be appreciated that the component 115 may have any suitable cross-sectional shape without departing from the spirit of the invention. Different cross sectional shapes provide different advantages that can be selected based on the intended use of the component. In some alternative examples that are not shown in the Figures, the components 115 could be formed into C-shaped, S-shaped or L-shaped cross-sections.

Figure 9:
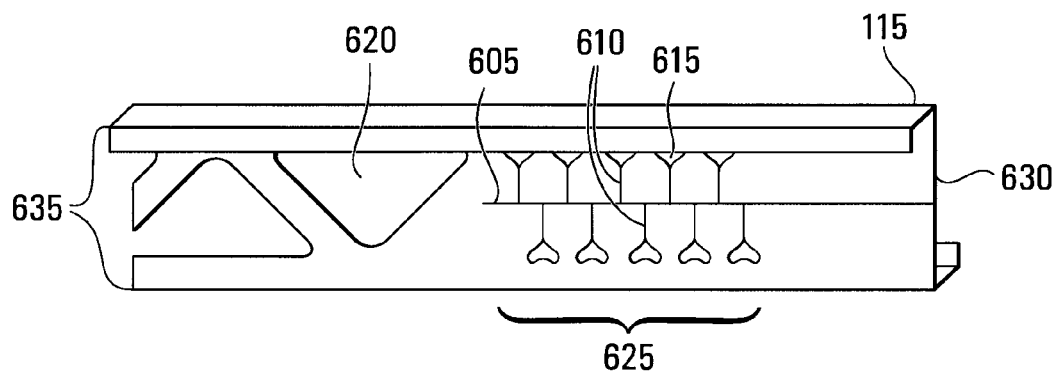
FIG. 9 shows a perspective view of a portion of the construction component of FIG. 3 prior to being bent, with cuts included therein according to a first non-limiting example of implementation.

Referring back to FIG. 2, the second step 210 in the process is to provide a plurality of cuts in the component 115. As shown in FIG. 9, the component 115 includes a longitudinal cut 605 and a plurality of transversal cuts 610 each having an end hole 615 at one end.

In a non-limiting example of implementation, the cuts are made using laser-cutting techniques, which allows the cuts to be made with a very high efficiency. It should, however, be appreciated that the cuts can be made using any suitable cutting technique known in the art, such as with a punch press, among other possibilities. The choice of cutting technique may be influenced by any of a number of factors, such as the required tolerances, cost factors and the available equipment and the requirements for streamlining the process. In accordance with a non-limiting example of implementation, the tolerances that are met depend on the methods that will be employed to rigidify the component 115. The more precise the rigidifying process, the higher the tolerances that are required. The purpose of the cuts is to provide a region of flexibility in the component 115 such that the component 115 can be bent, as will be described further on in the specification.

Figure 2:
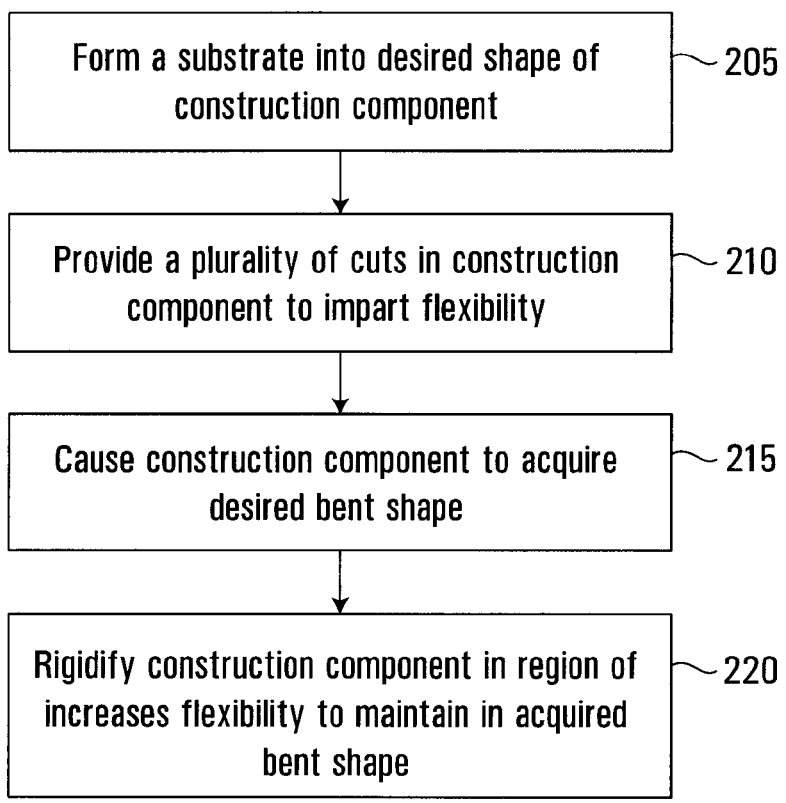
FIG. 2 shows a flow-diagram of a non-limiting process for manufacturing a construction component in accordance with the present invention.

Although step 210 is shown in FIG. 2 as taking place after step 205, it should be appreciated that the cuts that are formed in the component 115 can be formed either before or after the component 115 has acquired its cross-sectional shape. In the case of the flow chart of FIG. 2, the cuts can be formed in the component 115 after it has been formed into its cross-sectional shape. For example, in some cases, the component 115 may be purchased in its desired cross-sectional shape, or otherwise obtained, without the cuts contained therein. In such a case, the cuts are formed in the component 115 after the cross-sectional shape of the component has been obtained. Alternatively, the cuts can be formed in the sheet of material, prior to the material being formed into the cross-sectional shape of the component 115. Thus one can provide cuts in the sheet of material first and then form the sheet of material into the cross-sectional shape of the component 115 afterwards. In such a manner, the resulting component 115 has the desired pattern of cuts. In this exemplary embodiment, other cuts may be provided in the substrate at the same time. For example, the contour of the substrate may be cut to prepare it for forming into a component.

As mentioned above, in the non-limiting embodiment shown in FIG. 9, component 115 includes a plurality of cuts 605, 610, 615 and 620. These cuts include a longitudinal cut 605, a plurality of transversal cuts 610 in a region 625, end holes 615 and, optionally, weight-reducing holes 620.

Transversal cuts 610, along with longitudinal cut 605 and end holes 615 create a region 625 of increased flexibility in the component 115. Together, these cuts 610 and 605 permit the component 115 to bend by opening up, closing up, or by overlapping, shifting or sliding. Thus the region 625 of the component 115 shown in FIG. 9 is a region of increased flexibility allowing the component 115 to be bent or curved in this region. The component 115 can include bends in many different planes. Specifically, the cuts 610 and 605 facilitate bending in at least one plane.

As mentioned above, the components 115 are generally formed into beams having a desired cross section. As such, the components have a longitudinal axis that extends the length of the beam, and a transverse axis. In the particular example illustrated in FIG. 9, the component 115 includes a single longitudinal cut 605 that extends throughout region 625 and extends to one of the transverse ends 630 of component 115. There are two arrays of transversal cuts 610, one on each side of longitudinal cut 605. Transversal cuts 610 extend parallel to one another from the longitudinal cut 605 towards the longitudinal edges 635 of the component 115. In a non-limiting example of implementation illustrated in FIG. 10, the transversal cuts 610 form a "V" shape, so as to create a triangular material-free zone. As such, when component 115 is bent, the two sides of transversal cut 610 rejoin and thus "close up" the gap created by transversal cut 610. In this manner, there is no excess material that overlaps when the construction component is bent, or that sticks outward from the surface of the bent construction component.

Figure 13:
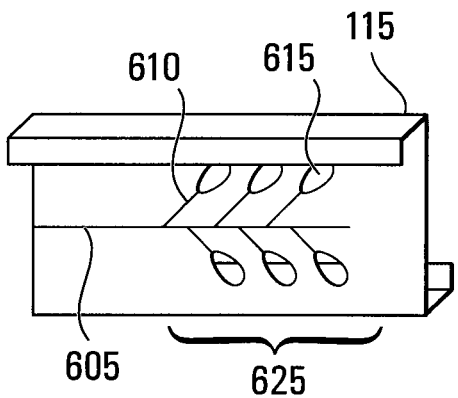
FIG. 13 shows a perspective view of a portion of a construction component with cuts included therein according to yet another non-limiting example of implementation.

Each transversal cut 610 terminates in an end hole 615 prior to reaching the longitudinal edge 635 of the component 115. It is to be understood that the particular pattern of cuts in FIG. 9 is intended as an example of a possible cut pattern. Any suitable pattern of cuts may be used. A person of skill in the art would be able to devise a pattern of cuts in order to achieve a desired result. When creating the cuts, there are multiple parameters that may be varied depending on a desired shape, the type of material used or the thickness of the material, among other possibilities. The spacing between the transversal cuts 610 can be constant, or alternatively can vary. For example, the density of the transversal cuts 610 may be larger where the curvature is expected to be more pronounced, which in this non-limiting example is in the center of region 625. Likewise, the length of transversal cuts 610 can vary. The transversal cuts 610 on both sides of the longitudinal cut 605 may be staggered, or otherwise misaligned, or may be perfectly aligned. In a non-limiting embodiment, transversal cuts 610 are purposely staggered such as to prevent the occurrence of areas along longitudinal cut 605 where two transversal cuts 610 intersect. This may be advantageous in avoiding insufficiency of material if longitudinal cut 605 is later welded. In another non-limiting embodiment illustrated in FIG. 13, transversal cuts 610 are in two arrays, the cuts 610 of each array being not parallel to each other.

The longitudinal cut 605 is any cut that extends parallel to a longitudinal axis of the component. In the embodiment shown in FIG. 9, the longitudinal cut 605 intersects with the plurality of transversal cuts 610. In this non-limiting example, longitudinal cut 605 follows the central longitudinal axis of the construction component down the middle of the component 115, intersecting with every transversal cut 610. Thus, transversal cuts 610 begin at an intersection with longitudinal cut 605 and end at their respective end hole 615. The term intersection as used herein is meant to designate any point where two lines, planes or volumes meet such as a t-junction, a right angle or an x-crossing. It should be understood that longitudinal cut 605 does not need to intersect with every single transversal cut 610. Also, longitudinal cut 605 may extend to one or both transverse ends 630 of component 115.

Figure 10:
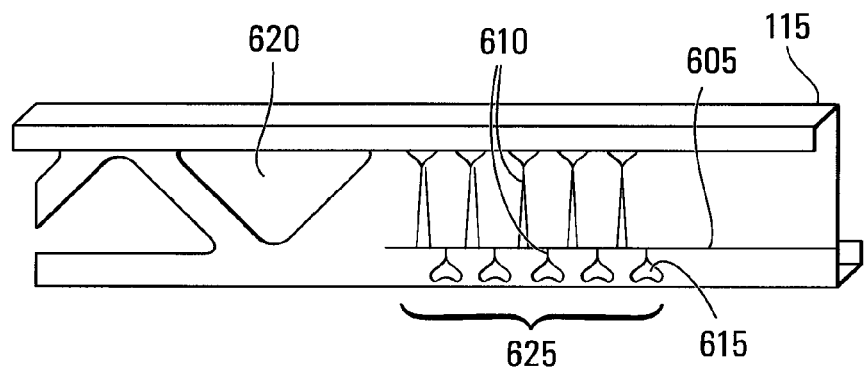
FIG. 10 shows a perspective view of a portion of a construction component in accordance with the present invention, prior to being bent, with cuts included therein according to a second non-limiting example of implementation.
Figure 11:
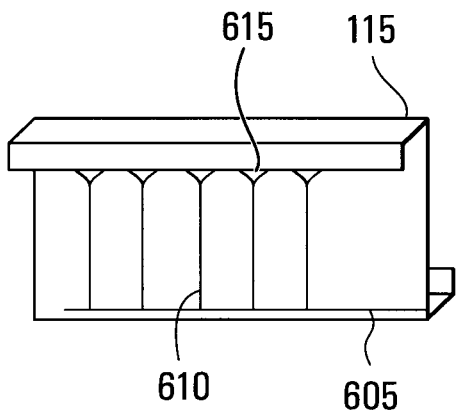
FIG. 11 shows a perspective view of a portion of a construction component with cuts included therein according to another non-limiting example of implementation.

In addition, it should be appreciated that the longitudinal cut 605 does not need to be positioned along the longitudinal central axis. In an alternate non-limiting embodiment, longitudinal cut 605 can be located closer to one of the longitudinal edges 635 of component 115, such that it does not extend along the central longitudinal axis. For example, as illustrated in FIG. 10, longitudinal cut 605 may be positioned closer to one longitudinal edge 635 than another. The position of longitudinal cut 605 with respect to the longitudinal center of component 115 can depend on the desired curvature of a bend in component 115. For example, longitudinal cut 605 can be positioned closer to the inside longitudinal edge 635 for bends having a tighter curvature such as to avoid large gaps when the transversal cuts 610 on the inside of the curve open up as component 115 is bent. In an alternative embodiment shown in FIG. 11, the longitudinal cut 605 is positioned along the bottom longitudinal edge 635.

Figure 12:
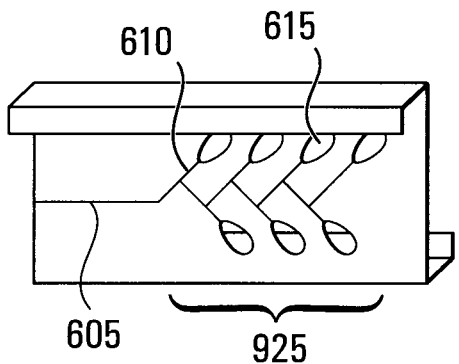
FIG. 12 shows a perspective view of a portion of a construction component with cuts included therein according to yet another non-limiting example of implementation.
Figure 14:
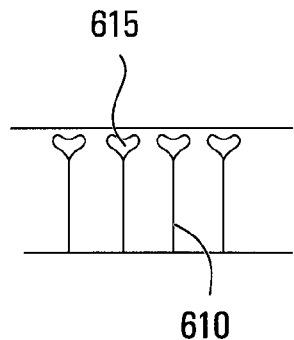
FIG. 14 shows a side view of a portion of the component of FIG. 7 prior to being bent, with cuts included therein according to an alternative non-limiting example of implementation.

Furthermore, it is to be understood that the presence of longitudinal cut 605 is optional as certain patterns of transversal cuts 610, such as the one illustrated in FIG. 12, may effectively replace longitudinal cut 605 either entirely or only in a certain region such as region 925. Another embodiment without a longitudinal cut 605 is illustrated in FIG. 14 where the transversal cuts 610 extend all the way to the edge of the component 115 such that they are free to widen, close or overlap when component 115 is bent. This embodiment would be possible, for example, in a component having a U-shaped cross-section, as shown in FIGS. 7 and 8. Also, although only one longitudinal cut 605 is illustrated in the exemplary embodiment of FIG. 9, there may be multiple longitudinal cuts 605 in component 115 including possibly multiple longitudinal cuts 605 in region 625.

Figure 15:
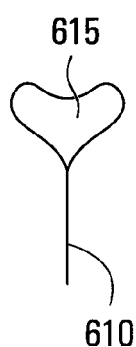
FIG. 15 shows a first non-limiting example of an end hole in accordance with the present invention.
Figure 16:
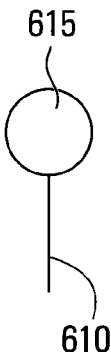
FIG. 16 shows a second non-limiting example of an end hole in accordance with the present invention.
Figure 17:
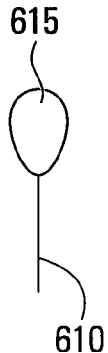
FIG. 17 shows a third non-limiting example of an end hole in accordance with the present invention.

In the embodiment shown in FIG. 9, each of the transversal cuts 610 terminates in an end hole 615. End holes 615 are optional and are included to reduce the likelihood of tearing, breaking or propagation of stress in each of cuts 610. In addition, end holes 615 may help impart flexibility in region 625. In the non-limiting example illustrated in FIG. 9, each of the end holes 615 is a roughly heart-shaped hole cut into the component at the end of each transversal cut 610. Heart shaped end holes 615 have the benefit of providing two inflection points per end hole 615 instead of one. As a result of the increased number of inflection point, a bent component 115 will feature a smoother curve with less deformation at each inflexion point. FIGS. 15-17 illustrate various alternative shapes for the end holes 615 including a heart-shaped hole (FIG. 15), a circular hole (FIG. 16) and a drop-shaped hole (FIG. 17). It should be noted that many other shapes and arrangements are possible for the end holes 615 and that the examples provided are not intended to limit the invention. Also, although in FIG. 9 the end holes 615 are only included at the ends of the transversal cuts 610, they may also be positioned at the beginning and/or end of the longitudinal cut 605.

For the purposes of illustration, the component 115 has been shown herein as having a particular cut arrangement. However, it should be appreciated that many different cut arrangements are possible without departing from the intended scope of the invention. In particular, it is to be appreciated that the presence of a longitudinal cut 605, end holes 615 and weight-reducing holes 620 is optional and that their presence in the exemplary embodiments shown is not intended to limit the scope of the present invention. Furthermore, it is to be appreciated that although the cuts have been presented here as having a certain pattern, the patterns shown are not intended to be regarded as limiting and many other cut patterns may adequately impart flexibility to the component. For example, it may be desirable to provide transversal cuts 610 that are not straight, or to arrange transversal cuts 610 in a direction that is not perpendicular to the length of the component, so as to suit a particular desired bend and/or rigidifying technique. It may also be desirable to provide transversal cuts 610 that are not thin slits, but thicker cutouts. In addition, although transversal cuts 610 are shown here as linear cuts on a planar body, in a component that is not thin in width, transversal cuts 610 may take the form of planar cuts through a voluminous body, which planar cuts may not necessarily define a flat plane. Transversal cuts 610 may also not necessarily be parallel to one another. In certain cases it may be desirable to provide transversal cuts 610 in two different planes or directions, or to provide transversal cuts 610 that converge or diverge. Some of the variations named here may be advantageous, for example, if a bend is desired that is not contained within a single plane (for example a spiral section).

Figure 26:
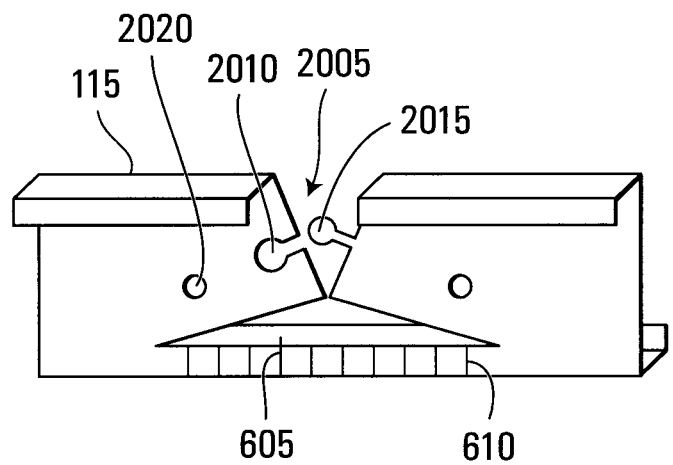
FIG. 26 shows a perspective view of a portion of a construction component with cuts included therein according to yet another non-limiting example of implementation.

An alternative non-limiting example of a cut pattern is illustrated in FIG. 26. Here transversal cuts 610 are present in an array on one side of longitudinal cut 605. On the other side of longitudinal cut 605, there is only one transversal cut, numbered here 2005, that extends all the way to the edge of component 115. Transversal cut 2005 widens towards the edge of component 115 so as to form an approximate "V" shape. Longitudinal cut 605 itself is not a straight line but defines a wider gap that is enlarged around the center of the region 625 of increased flexibility. Longitudinal cut 605 does not extend all the way to a transverse end 630 of component 115, although this may not be the case in alternate embodiments. Optionally, two additional hole cuts 2020 define holes that may be used to align a cover plate 1905. Hole cuts 2020 may also be used to affix a cover plate 1905 to component 115, for example, by providing a passage for a screw or rivet. Optionally, the cut pattern includes a tab 2015 that protrudes outwardly from one side of transversal cut 2005 and is shaped so as to embrace a tab cutout 2010 which extends into the other side of transversal cut 2005. When component 115 is bent, the tab 2015 is able to mate with the tab cutout 2010 when the two sides of transversal cut 2005 approach each other. This facilitates holding the two sides of transversal cut 2005 together during a rigidifying process. If tab 2015 and tab cutout 2010 are present, tab 2015 may be inserted into tab cutout 2010 such as to hold component 115 in the bent shape. Hence component 115 may thus be rigidified or just held in place to facilitate a further rigidifying process such as welding. It should be noted that although only one transversal cut 2005 and only one combination of tab 2015 and tab cutout 2010 are shown here, any number of transversal cuts 2005, tabs 2015 and tab cutouts 2010 in any shape may be used.

Figure 24:
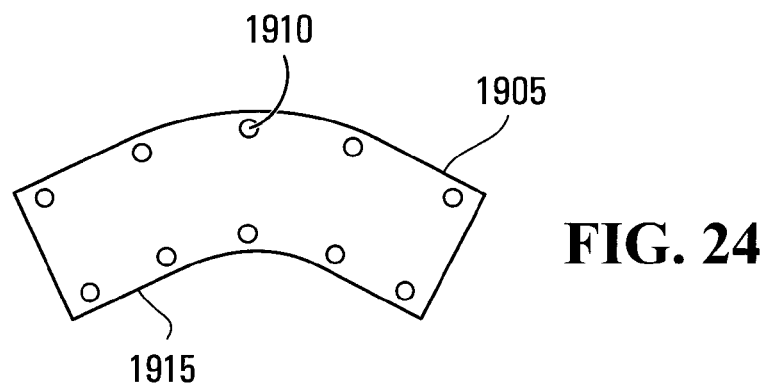
FIG. 24 shows a non-limiting example of a cover plate according to the present invention.
Figure 28:
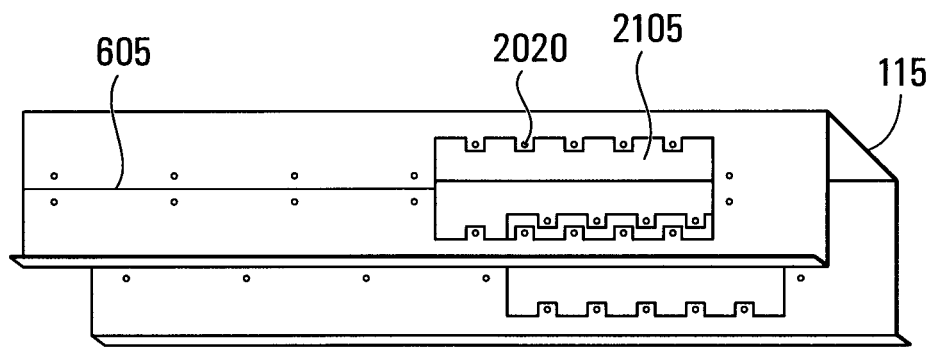
FIG. 28 shows a perspective view of a portion of a construction component with cuts included therein according to yet another non-limiting example of implementation.

Yet another non-limiting example of implementation is illustrated in FIG. 28. Here, longitudinal cut 605 widens into a large cutout 2105 that is formed of a plurality of smaller horizontal and vertical cuts. However, it should be appreciated that the large cutout 2105 may have any particular shape formed of a variety of different smaller cuts. Hole cuts 2020, similar to those shown in FIG. 24 are positioned along the periphery of longitudinal cut 605 and around the large cutout 2105 area. It should be noted that hole cuts 2020 are optional and that although they have been shown here as being around the large cutout 2105 area and around other areas of longitudinal cut 605, hole cuts 2020 may be present or absent anywhere on component 115. Furthermore, although large cutout 2105 is shown here as a continuous, roughly rectangular area, it may have any suitable shape and may be discontinuous.

Figure 18:
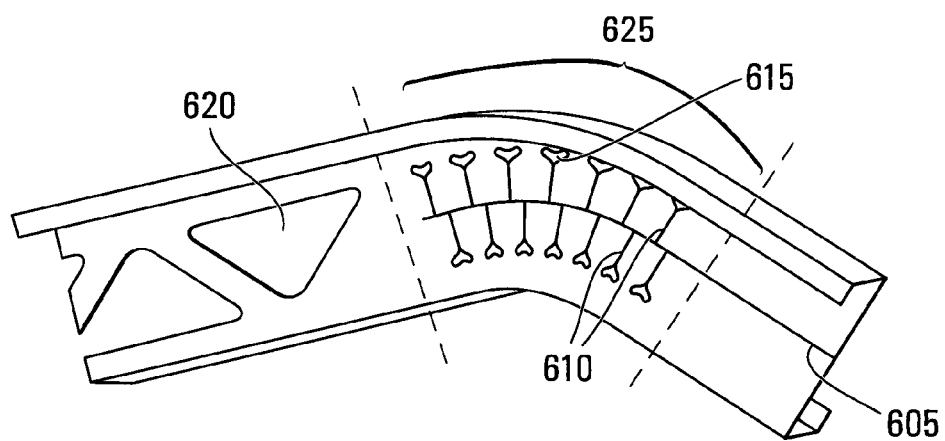
FIG. 18 shows a perspective view of a portion of the construction component of FIG. 3 after being bent.

Referring back to FIG. 2, after the cuts have been formed in the component 115 such that a region 625 of increased flexibility has been obtained, at step 215 of the process, the component 115 is bent in the region of increased flexibility 625. Shown in FIG. 18 is a non-limiting example of a component 115 that is bent in the region 625 of increased flexibility 625. In a non-limiting example, the bend in the region of increased flexibility 625 has a radius of curvature within the range of 8 inches to 200 inches.

Figure 19:
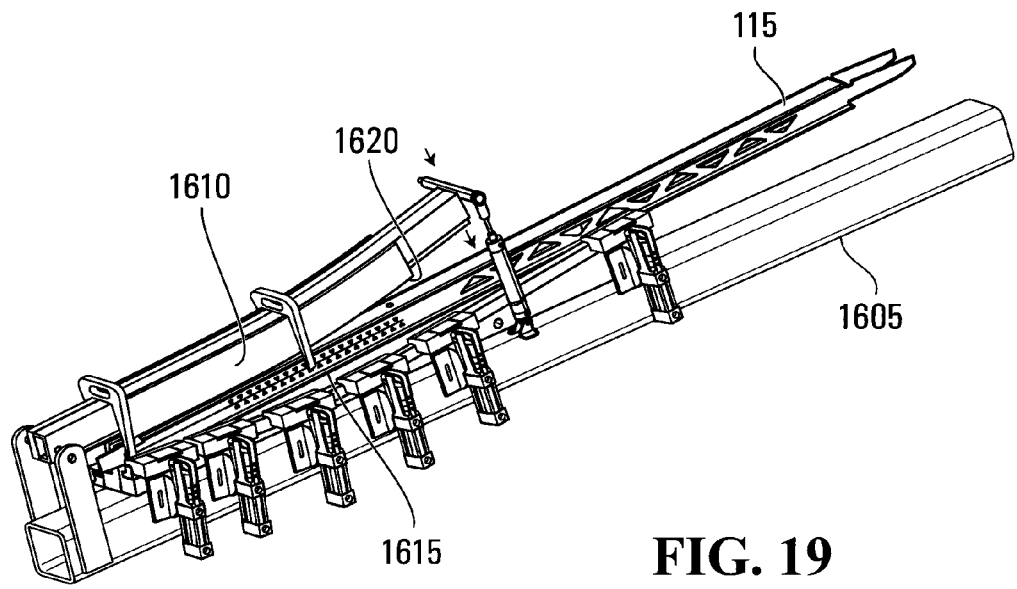
FIG. 19 shows a construction component included within a non-limiting example of a press-guide suitable for bending the construction component.
Figure 20:
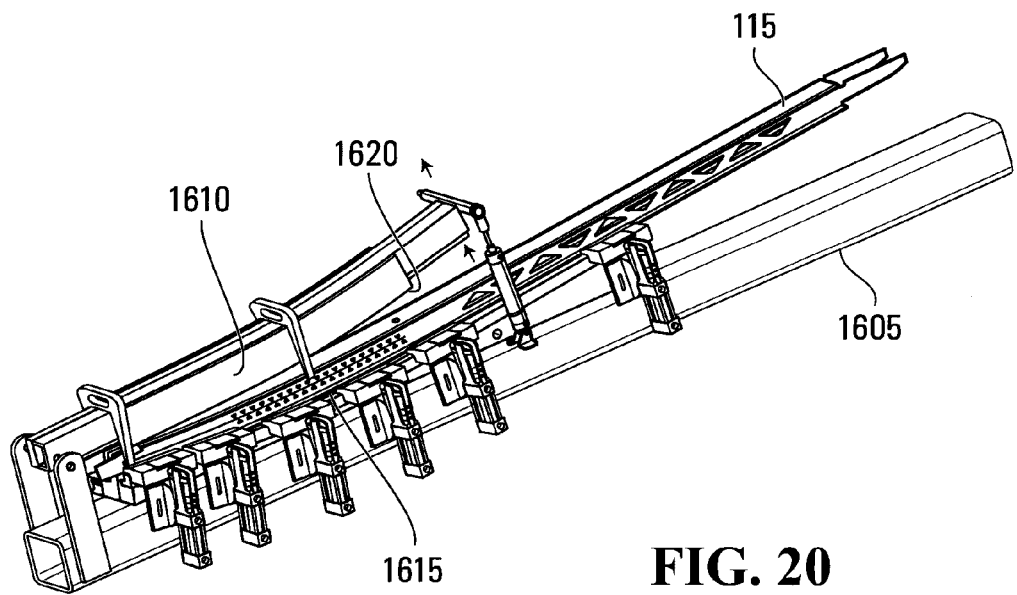
FIG. 20 shows the construction component included within the press-guide of FIG. 19 after the construction component has been bent.

Any suitable technique for bending the component 115 may be used. For example, in a non-limiting embodiment, component 115 is bent using a press-guide to ensure the desired shape is obtained. Shown in FIGS. 19 and 20 is a non-limiting example of a press-guide 1605 for causing the component 115 to acquire a desired bend. In the non-limiting example illustrated in FIGS. 19 and 20, press-guide 1605 has a component-engaging surface 1615 defining the desired bent outline of one surface of the component 115. The component 115 may be forced into engagement with the component-engaging surface 1615 by any suitable means, such as by applying pressure with a pressing implement 1610. Pressing implement 1610 may itself have a component-engaging surface 1620, which may be shaped to embrace another surface of component 115. Component-engaging surfaces 1615 and 1620 may include groves to hold component 115 in place and ensure that it remains in the desired plane or orientation.

Figure 21:
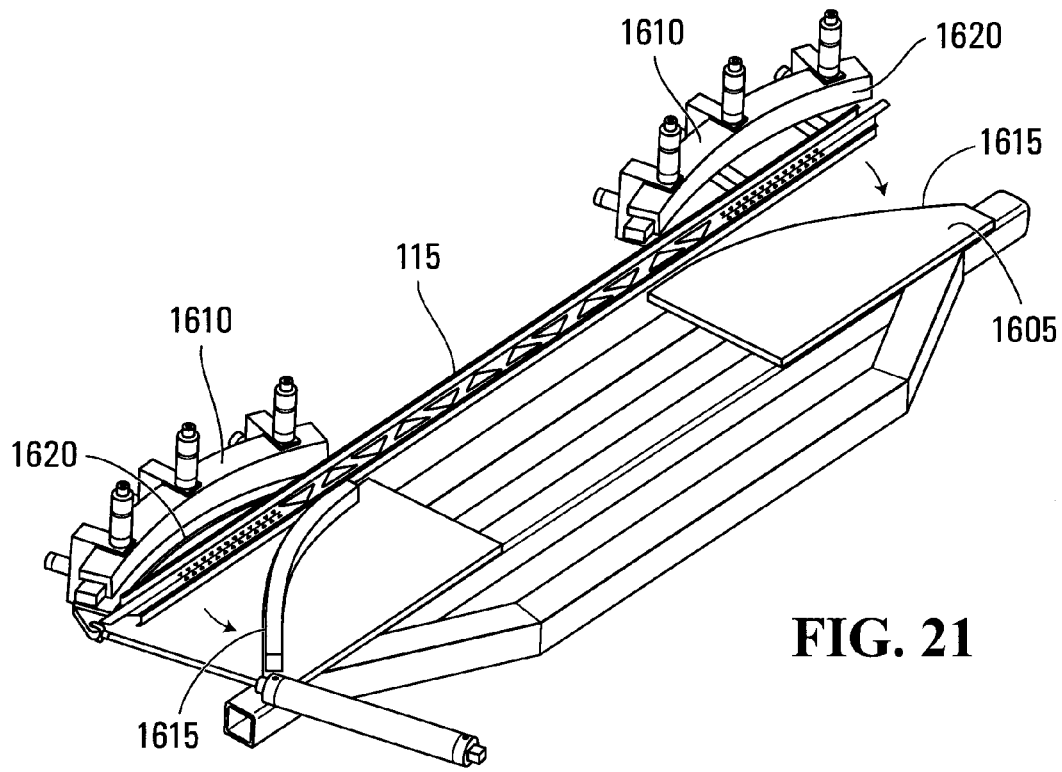
FIG. 21 shows an example of a construction component included within another non-limiting example of a press-guide.
Figure 22:
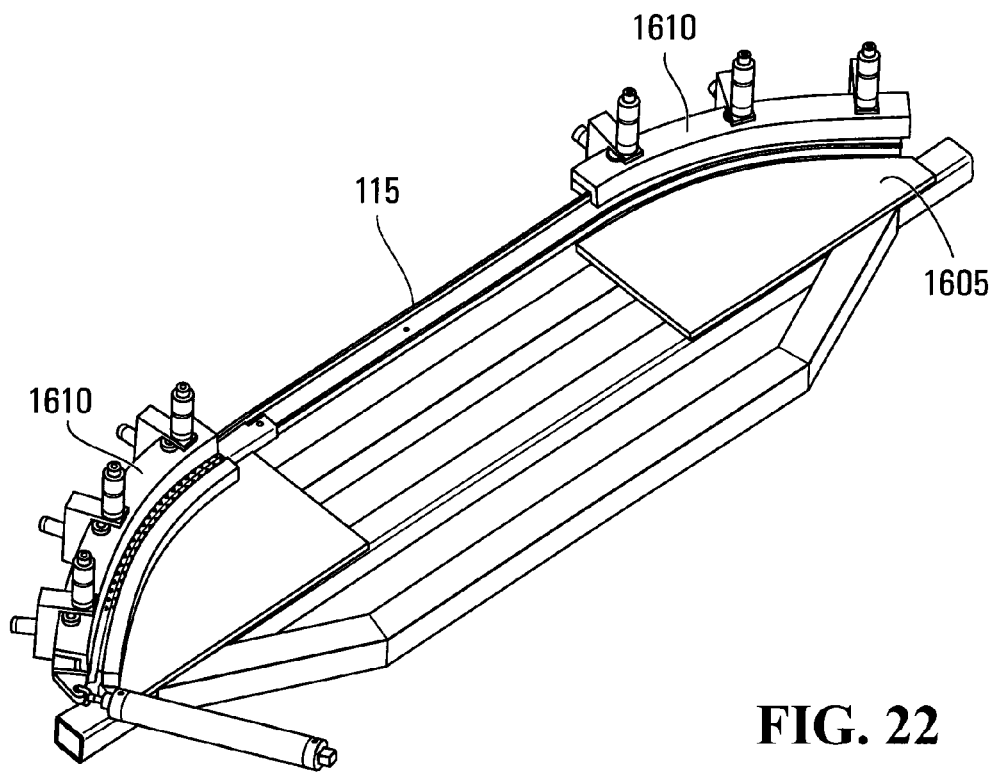
FIG. 22 shows the construction component included within the press-guide of FIG. 21 with the press-guide in a closed position.

Although the press-guide 1605 illustrated in FIGS. 19 and 20 causes the component to acquire a single bend, it should be noted that in alternate non-limiting embodiments press-guide 1605 may cause component 115 to acquire any number of bends having any particular configuration. FIGS. 21 and 22 illustrate a press-guide 1605 for causing component to acquire two bends such as bends 120 of the roof carline illustrated in FIG. 1.

It should be appreciated that there exist many different ways of creating a bend in the component 115 (including by hand), as well as many possible variants to press-guide 1605, all of which are in the included within the scope of the invention. For example, press-guide 1605 (or pressing implement 1610) may not contact component 115 on all of its surfaces, but only on discrete segments thereof. Furthermore, it may be desired to have certain segments of component 115 overlap or deform during the creation of a bend. In certain non-limiting embodiments, component 115 is pre-disposed during earlier steps to overlap or deform as desired.

Finally, at step 220 shown in FIG. 2, after the component 115 has been bent into the desired shape, the bent component 115 is rigidified in the region 625 of increased flexibility. The component 115 may be rigidified by any suitable means in order to maintain the component 115 in the bent configuration. In one non-limiting embodiment, the region of increased flexibility is rigidified by welding the material of component 115 in the region 625 of increased flexibility along some or all of the cuts 605, 610. Welding results in a weld line being created where the welding has taken place. However any other suitable means may be used to impart rigidity in region 625, such as by heat fusing, heat pressing, irradiating or any other method known in the art for causing a material bond to take place. Alternatively, mechanical fasteners, such as rivets, bolts or plates, can be used to impart rigidity in the region of increased flexibility 625.

In accordance with a non-limiting embodiment, rigidity is imparted to the component 115 while it is contained within the guide 1605. Advantageously, guide 1605 is able to maintain the component in the bent shape while allowing sufficient access to the cut surfaces of component 115 to permit the rigidifying step 220 to be performed. It should be appreciated that any other means of maintaining component 115 in the desired shape may be used during this step without departing from the intended scope of the present invention. For example, if the component is malleable, it may not require any applied force to keep its shape once bent.

Figure 23:
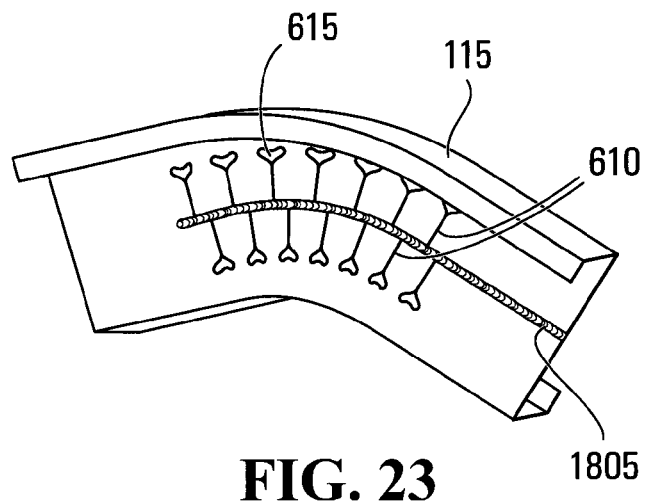
FIG. 23 shows a perspective view of the portion of the construction component of FIG. 16 with a including therein a weld line according to a non-limiting example of implementation.

As mentioned above, the rigidification of the component 115 is done in the regions of increased flexibility where the component has been cut so as to remove the flexibility that was previously imparted by the cuts. In this manner, once rigidified, the cuts no longer provide a region of increased flexibility. In a non-limiting example, the rigidification is performed by welding along the longitudinal cut 605, thus sealing the longitudinal cut 605 and joining all the transversal cuts 610 together. This example is illustrated in FIG. 23, where longitudinal cut 605 has been welded along line 1805. Rigidifying the component 115 in such a manner locks the intersections between transversal cuts 610 and the longitudinal cut 605, thus imparting rigidity in the region 625. Optionally, some welding may be performed along transversal cuts 610 instead of, or in addition to, along the longitudinal cut 605. In a non-limiting example, the welding that is performed is full-penetration welding. The welding may be done manually or via automation. For example, the welding can be performed in an automated fashion while the component is held in a desired shape by the press-guide. In accordance with an alternative non-limiting embodiment, the component is laser-welded in the regions of increased flexibility.

As mentioned above, in certain non-limiting embodiments, a cover plate 1905 may be used to rigidify the region of increased flexibility of the component 115. FIG. 24 illustrates a non-limiting example of a cover plate 1905 suitable for this use. As shown, cover plate 1905 is a piece of material similar to that of the substrate or component 115 and has a profile that is generally curved or bent in accordance with the desired bent shape of the component 115. Thus, once the component 115 has been bent, the cover plate 1905 can be placed over the bent region of increased flexibility, and secured to the sides of the component 115, as shown in FIG. 25.

In a non-limiting example of implementation, cover plate 1905 is cut out of a metal substrate from which component 115 is created and has a profile generally complimenting a desired bend in component 115. Optionally, cover plate 1905 may include hole cuts 1910 therein. In a non-limiting example of implementation, the component 115 can also include cut-out holes 2020 in the region of increased flexibility. As such, the hole cuts 1910 contained in the cover plate 1910 may be used to align cover plate 1905 on the component 115 by aligning the hole cuts 1910 of the cover plate with the corresponding cut-out holes 2020 on the component 115. The hole cuts 1910 may then be used as pathways for screws or rivets, thus permitting the mechanical rigidifying of component 115. In addition, given that the cut-out holes 2020 included in the component 115 will be used to align the cover plate 1905 with the bend in the component 115, these cut-out holes 2020 may also be used as guides for bending component 115 such that there is consistency in the bend shape of the components 115.

Figure 25:
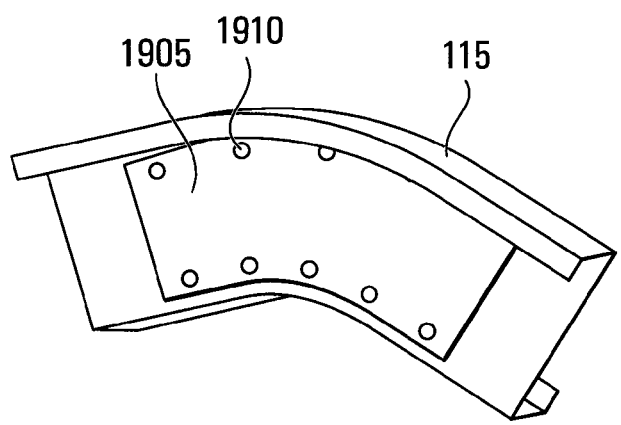
FIG. 25 shows the cover plate of FIG. 24 affixed to a construction component in accordance with a non-limiting example of implementation of the present invention.

FIG. 25 illustrates cover plate 1905 as arranged on component 115 to impart rigidity thereto. Cover plate 1905 is fastened by any suitable means to component 115. In a non-limiting example, cover plate 1905 is welded to component 115 along a portion or all of its periphery 1915, thus creating a weld line along a portion, or all of its periphery 1915. In another non-limiting example, cover plate 1905 is mechanically fastened by any suitable means, such as by inserting screws or rivets through aligned hole cuts 1910 of cover plate 1905.

Figure 27:
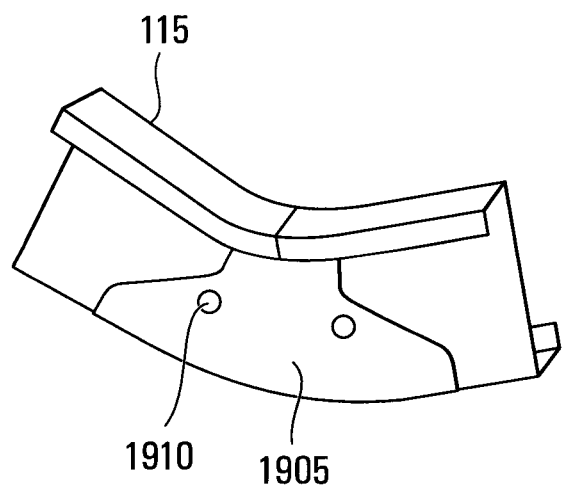
FIG. 27 shows a perspective view of the construction component of FIG. 26 including a plate thereon for rigidifying the construction component in a bent configuration.

FIG. 27 also illustrates a non-limiting example of a component 115 that is rigidified through the use of a cover plate 1905. Here two cut-out holes 1910 are used to align cover plate 1905 with component 115. The cover plate 1905 is then welded to component 115. Here cover plate 1905 is not planar but includes a bent lip portion that embraces the Z-shape of component 115.

Figure 29:
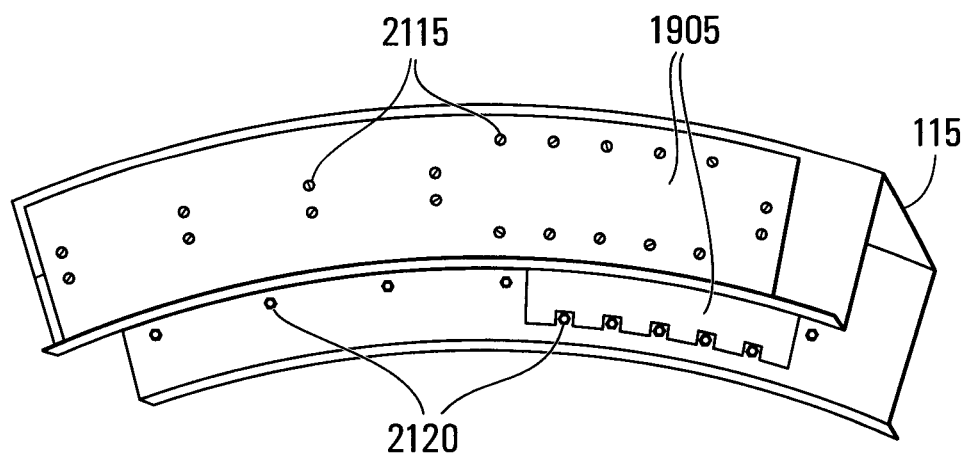
FIG. 29 shows a perspective view of the component shown in FIG. 28 including a plate thereon for rigidifying the construction component in a bent configuration.

FIG. 29 illustrates yet another non-limiting example of a component 115 rigidified by a cover plate 1905. Here a cover plate 1905 is screwed to component 115 using screws 2115 and bolts 2120.

The cover plates used to rigidify the regions of increase flexibility of the components 115 may be bent in the surface of a plane formed by its material or may be cut out of a material in the bent shape. Although the cover plates 1905 may be made of a material similar to that of the component 115, it should be appreciated that the cover plate 1905 may be made of any other material suitable for rigidifying component 115. It is also to be appreciated that any appropriate means for fastening cover plate 1905 to component 115 may be used, and is not to be limited to welding, screwing or riveting.

It will be appreciated that depending on the materials used to form component 115, the cut pattern and the form of the bend desired, any of a number of different rigidification techniques may be suitable, all of which are included within the intended scope of the present invention. It may be desirable to add material during the rigidification process, such as filler to form a weld puddle, or another structural piece for adherence to the component 115. For example, additional parts may be added to component 115 in the welding process, thus completing fabrication of component 115 only then. In another exemplary embodiment, component 115 may itself be welded onto another item, for example another component.

Figure 30:
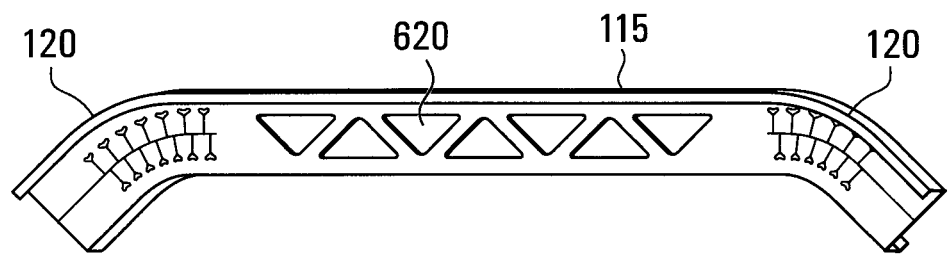
FIG. 30 shows a perspective view of a finished construction component in accordance with a non-limiting example of implementation of the present invention for use within a rail car.

The component 115 can contain any number of regions 625 of increased flexibility having flexibility in any number of planes or around any number of axes. As mentioned above, in a non-limiting example of implementation, the component 115 is used for a train car roof carline. In this embodiment, it may be desirable for the component 115 to have two bends, as illustrated in FIG. 30.

In the embodiment shown in FIG. 3, the cuts 610 and 605 are included within the central portion 305 of the component. However, in the embodiment shown in FIGS. 5 and 7, the components are to be bent in the plane of the two parallel sides 440 and thus cuts are provided in both those sides to create a region of increased flexibility in the desired plane.

As shown in FIG. 9, in certain cases, weight-reducing holes 620 may be provided in component 115. These weight-reducing holes 620 enable the component to be lighter than without the weight-reducing holes 620. In the non-limiting example of embodiment illustrated FIG. 3, weight-reducing regions are provided within the central portion of the component 115, however weight-reducing holes 620 may be provided on any desired region of component 115. For example, in a component having a U-shaped cross section, as illustrated in FIGS. 7 and 8, weight-reducing holes 620 may be provided on the two parallel sides 440 or on the bottom side 445.

The component 115 may be formed entirely from a single metal substrate. However, in an alternative embodiment, the components 115 may be partially assembled during step 220. For example, a component having a U-shaped cross section as illustrated in FIGS. 7 and 8 may be assembled by welding the two parallel sides 440 to the bottom side 445. Any other suitable means of forming structural component 115 may be used and are included within the intended scope of the invention.

With reference to the process described above with respect to FIG. 2, it is to be appreciated that although steps 205, 210, 215 and 220 have been illustrated as discrete sequential steps, this was only for the purposes of illustrating, not limiting the invention. Indeed, the order of steps 205, 210, 215 and 220 may not follow the order presented in FIG. 2 but may be performed in any suitable order. Furthermore, the steps illustrated in FIG. 2 may be split, overlapped or merged as appropriate given the manufacturing circumstances or design requirements. For example, bending of the component 115 may take place during the cutting of the cutting process. Also, although the steps illustrated in FIG. 2 are illustrated only once, it is to be understood that each step may be repeated any number of times at any particular point in the process without departing from the intended scope of the invention. In a non-limiting example of embodiment, component 115 is successively cut and bent multiple times prior to rigidifying. Alternatively, component 115 may be cut, bent and rigidified successively multiple times until the desired form is obtained.

An advantage of the above noted process is that the steps to be performed can generally be performed in an average workshop. The practice of the present invention may thus represent a significant cost reduction in the manufacture of components. Furthermore, since stretch forming is usually outsourced, an additional layer of savings may be achieved by eliminating the need to outsource production of components 115.

In addition, substantial savings can be obtained by eliminating the waste material resulting from the stretch forming process.

Since the component 115 described in the above is not stretch formed, there is no unpredictable inconsistency in the thickness of the component 115. It is thus possible to form component 115 with optimal thicknesses without the need for overestimating the quantity of required material. Advantageously, component 115 may contain reduce waste material and may have more consistent performance than its stretch formed counterpart.

In many industries, particularly in the transportation industry, it is highly desirable to reduce weight of structural items. The present invention is therefore particularly advantageous in that it permits the optional addition of weight-reducing holes 620 in the component 115 or substrate during the cutting process. Whereas using prior art techniques, it would have been prohibitively expensive to add the additional manufacturing step of setting up a component for cutting and cutting holes into it, by the present invention the component is already being cut and it is thus trivial to add additional holes into it. Beneficially weight-reducing holes 620 may reduce the overall weight of the component 115 while not significantly reducing component strength.

In accordance with a non-limiting embodiment, a component for a train car frame can be manufactured via the above described process that includes good strength and weight characteristics.

In addition, weight-reducing holes 620 may be useful for fastening things to component 115 or for allowing cables or other items to pass through component 115. In the non-limiting embodiment shown in FIG. 9, weight-reducing holes 620 have a triangular shape and are arranged in two parallel, overlapping rows. It is to be understood, however that any desired shape holes may be made into the component 115, the desired weight, structural integrity and uses for holes all being potential factors in the choice of hole shape.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A construction component formed by:
   a) providing a plurality of cuts in said construction component to create a region of increased flexibility, said plurality of cuts comprising a plurality of transversal slits and a longitudinal cut, said plurality of transversal slits including a first array of transversal slits and a second array of transversal slits located extending outwardly from and on opposite sides of said longitudinal cut in a staggered arrangement;
   b) bending said construction component in said region of increased flexibility so as to cause said construction component to acquire a bent shape that defines an arcuate curve, said longitudinal cut being configured to follow said arcuate curve of said bent shape,
   wherein said plurality of cuts is provided in a single sheet of material.

2. The construction component as defined in claim 1, said construction component further formed by rigidifying said construction component in said region of increased flexibility so as to cause said construction component to maintain said bent shape.

3. The construction component as defined in claim 2, comprising a weld linking at least some of said plurality of cuts for rigidifying said construction component.

4. The construction component as defined in claim 2, wherein said weld includes a weld line that follows at least a portion of said longitudinal cut.

5. The construction component as defined in claim 2, comprising a cover plate positioned over at least some of said plurality of cuts and affixed to said construction component for rigidifying said construction component.

6. The construction component as defined in claim 5, wherein said cover plate is affixed to said construction component via at least one of a weld, an irradiation portion, heat fusing, bolts, rivets and screws.

7. The construction component as defined in claim 1, wherein each of said plurality of transversal slits includes an end hole.

8. The construction component as defined in claim 1, wherein said arcuate curve has a radius of curvature of between 8 inches to 200 inches.

9. The construction component as defined in claim 1, wherein said plurality of transversal slits includes at least three transversal slits substantially equidistant from one another.

10. The construction component as defined in claim 1, wherein said plurality of transversal slits are substantially parallel.

11. The construction component as defined in claim 1, wherein said construction component is used in a transportation vehicle.

12. The construction component as defined in claim 11, wherein said transportation vehicle is a train car.

13. The construction component as defined in claim 12, wherein said construction component is a roof carline of said train car.

14. The method of creating a bend in a construction component, said method comprising:
   a) providing a plurality of cuts in said construction component to create a region of increased flexibility, said plurality of cuts comprising:
      i) a longitudinal cut positioned between two longitudinal edges of said construction component; and
      ii) a plurality of transversal slits, wherein each of said plurality of transversal slits intersects said longitudinal cut and extends from said longitudinal cut to a position short of one of said two longitudinal edges of said construction component, said plurality of transversal slits including a first array of transversal slits and a second array of transversal slits extending outwardly from and on opposite sides of said longitudinal cut in a staggered arrangement; and
   b) bending said construction component in said region of increased flexibility so as to cause said construction component to acquire a bent shape,
   c) wherein said plurality of cuts is provided in a single sheet of material.

15. The method as defined in claim 14, further comprising rigidifying said construction component in said region of increased flexibility to cause said construction component to maintain said bent shape.

16. The method as defined in claim 15, wherein bending said construction component into said bent shape includes forcing said construction component against a press-guide having a pre-defined configuration for causing said construction component to acquire said bent shape.

17. The method as defined in claim 16, wherein rigidifying said construction component in said region of increased flexibility is performed while said construction component is positioned against the press-guide.

18. The method as defined in claim 15, wherein rigidifying said construction component in said region of increased flexibility includes performing at least one of welding, irradiating and heat fusing said construction component in said region of increased flexibility.

19. The method as defined in claim 15, wherein rigidifying said construction component in said region of increased flexibility includes affixing thereto a cover plate.

20. The method as defined in claim 14, wherein said construction component is formed into a cross sectional shape from a flat sheet of material, said plurality of cuts being formed into said flat sheet of material prior to said flat sheet of material being formed into the cross sectional shape of said construction component.

21. The method as defined in claim 14, wherein said plurality of cuts are formed via laser cutting techniques.

22. The method as defined in claim 14, wherein each of said plurality of transversal slits includes an end hole.

23. The method as defined in claim 14, wherein said region of increased flexibility is bent so as to define an arcuate curve having a radius of curvature of between 8 inches and 200 inches.

24. The method as defined in claim 14, wherein said plurality of transversal slits includes at least three transversal slits substantially equidistant from one another.

25. The method as defined in claim 14, wherein said plurality of transversal slits are substantially parallel.

26. The method as defined in claim 14, wherein said construction component is used in a transportation vehicle.

27. The method as defined in claim 26, wherein said transportation vehicle is a train car.

28. The method as defined in claim 27, wherein said construction component is a roof carline of said train car.

\* \* \* \* \*